Figure 1:
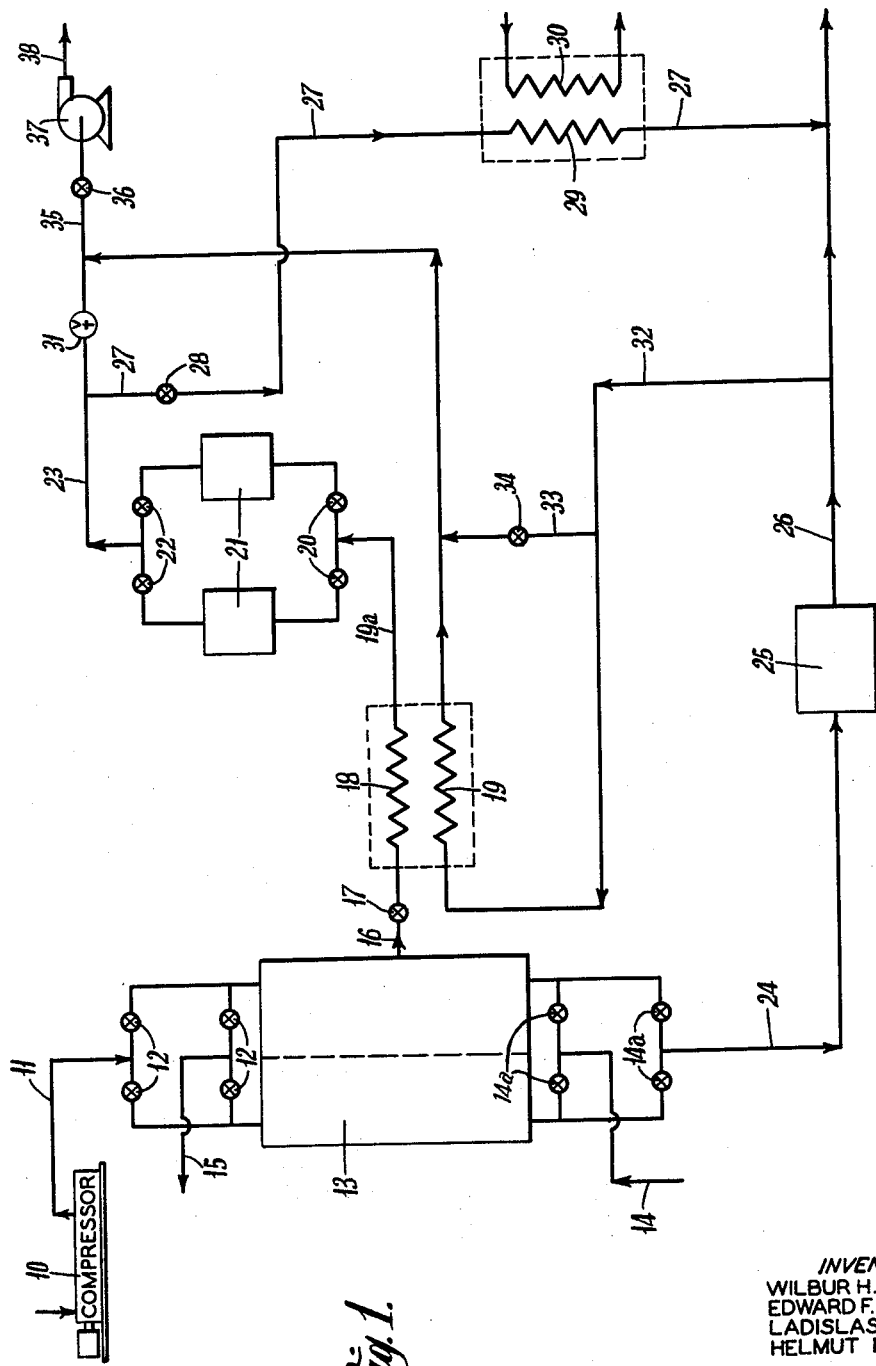

July 21, 1964

L. C. MATSCH ETAL 3,141,751

PROCESS AND APPARATUS FOR PURIFYING AND
SEPARATING COMPRESSED GAS MIXTURES
Original Filed Aug. 12, 1957

INVENTORS
WILBUR H. LAUER
EDWARD F. YENDALL
LADISLAS C. MATSCH
HELMUT KOEHN

BY
William F. Mesinger
ATTORNEY

United States Patent Office 3,141,751
Patented July 21, 1964

3,141,751
PROCESS AND APPARATUS FOR PURIFYING AND SEPARATING COMPRESSED GAS MIXTURES
Ladislas C. Matsch and Edward F. Yendall, Kenmore, Wilbur H. Lauer, Snyder, and Helmut Koehn, Tonawanda, N.Y., assignors to Union Carbide Corporation, a corporation of New York
Original application Aug. 12, 1957, Ser. No. 677,606, now Patent No. 2,984,079, dated May 16, 1961. Divided and this application May 23, 1960, Ser. No. 75,646
14 Claims. (Cl. 62—14)

This invention relates to an improved process of and apparatus for purifying and separating compressed gas mixtures, and more particularly to improved process and apparatus for the separation of water and carbon dioxide impurities from compressed air prior to low temperature rectification of such air into air components.

This application is a division of our application Serial No. 677,606, filed August 12, 1957, now Patent No. 2,984,079, dated May 16, 1961.

Atmospheric air contains substantial quantities of water and carbon dioxide impurities, and unless these impurities are removed by chemical treatment of the air, or by adsorption therefrom, they will deposit as solid particles on the air side heat exchanger surfaces as the air is cooled. This causes considerable difficulty, because if such deposition is continued the air side heat exchange surfaces become coated with thick layers of solid partices thus reducing heat transfer efficiency. Eventually these surfaces will plug up completely, making the air separation process inoperative. One solution to this problem is to utilize duplicate heat exchangers piped in parallel so that a clogged heat exchanger may be thawed while the other is in use. However, such duplication is an expensive solution because the heat exchangers represent a major item of air separation plant investment cost.

In air separation plants employed relatively low air supply pressures, most of the water and carbon dioxide impurities are removed from the incoming air and deposited in a reversible heat exchange zone by heat exchange with outgoing air separation products. This zone may comprise heat exchangers of the regenerative or passage exchanging types. In order to avoid a build-up of ice and carbon dioxide solid particles in such heat exchange zone, the zone must be "self-cleaning." This means that all of the impurities deposited in the zone during an air intake stroke must be evaporated and swept out during the next succeeding product gas stroke. The self-cleaning condition may not be achieved by simply passing all of the outgoing product gas through the reversible heat exchange zone because compressed air, especially at low temperatures, has a substantially greater specific heat than the non-compressed air separation products, e.g. oxygen and nitrogen.

The prior art has devised many ways of alleviating this condition, one of which involves partially cooling the incoming air stream in the reversible heat exchange zone and depositing the water impurity in such zone. A minor portion of the partially cooled air stream is withdrawn from the zone and separately cleaned, while the major portion of the air stream is further cooled in the reversible heat exchange zone. Most of the major portion's carbon dioxide content is removed by deposition in such zone. Since by this arrangement, the volume of outgoing air separation products passing through the colder part of the zone is substantially greater than the volume of incoming air passing through this part, the reversible heat exchange zone can be made self-cleaning. One method of cleaning the diverted minor portion of partially cooled air, or "side-bleed," is to chill the latter well below the carbon dioxide deposition point by direct mixing with a small part of the further cooled or "cold end" air having passed through the entire length of the reversible heat exchange zone. Unfortunately this scheme has several important disadvantages. If direct mixing is used, local precipitation of carbon dioxide is likely to occur at the point of mixing, thus requiring a filter to remove the solid particles. Also, if colder air is mixed with the side-bleed air, a larger quantity of air must be processed by the filter, and a larger filter must be used to avoid a higher pressure drop. For control purposes, it is desirable to maintain the pressure drop in the side-bleed circuit as low as possible. Furthermore, to mix cold end air with the side-bleed air, the latter must be slightly throttled. This is because the undiverted air is subjected to additional pressure drop in passing through the colder part of the reversible heat exchange zone. As a result of the side-bleed throttling necessity, if any part of the carbon dioxide-free throttled side bleed air is subsequently to be bypassed to the cold end air stream, the latter must also be slightly throttled to obtain flow in the desired direction. Throttling of the cold end is undesirable as it substantially increases the air compression power costs.

Another problem connected with the side-bleed method of unbalancing a reversible heat exchange zone for self-cleaning is determining the temperature level for such side-bleeding. The ideal temperature range for side-bleeding regenerators or reversing heat exchangers is $-80°$ C. to $-100°$ C. There are several reasons for this selection, as follows:

(1) The side-bleed air volume necessary for self-cleaning is less at warmer levels than at colder levels. For example, the required volume at the $-120°$ C. level is 30% to 40% greater than at the $-100°$ C. level.

(2) A warmer side-bleed point avoids approaching too closely the level at which carbon dioxide begins to deposit, e.g. approximately $-134°$ C. for 75 p.s.i. air. The safe margin for trouble-free operation of regenerators or reversing heat exchangers is substantially reduced by lowering the side-bleed level below $-120°$ C.

(3) In the case of reversing heat exchangers, the units are normally available in standard lengths, and this conveniently fixes the temperature between the warm and cold units at approximately $-100°$ C. Withdrawing the side-bleed at a colder level would require remanifolding the complex passages at an intermediate point in the cold unit. Although this can be done, it adds appreciably to the cost of the exchangers.

One practical method of removing the carbon dioxide impurity from the air side-bleed is by gas phase adsorption using an adsorbent such as silica gel. In this manner the dissolved carbon dioxide may be removed while still in solution, thereby avoiding the difficulties of solid precipitation. Unfortunately, the ideal temperature for side-bleeding the reversible heat exchange zone does not correspond with the ideal operating temperature range for a silica gel trap, the latter being $-120°$ C. to $-130°$ C. This range is advantageous because the carbon dioxide adsorbing capacity of silica gel is considerably higher at lower temperatures.

A further problem arises if an air stream is to be expanded with the production of external work and low-temperature refrigeration. The side-bleed air is a convenient source of warm gas for such work expansion, but either or both its temperature and volume may be unsuitable for such work expansion. For example, the optimum expansion turbine inlet temperature is approximately $-153°$ C., which of course is substantially below either the optimum side-bleed or silica gel adsorption temperature. The turbine inlet temperature is selected so as to operate as cold as possible and yet avoid appreciable liquid condensation in the turbine discharge. The latter is undesirable as it produces erosion of the turbine blades and loss of efficiency. Also, the addition of colder air to the side-bleed air to obtain this optimum temperature level for the turbine will generally result in a larger volume of air than is desired for work expansion. The quantity of air to be work expanded is determined by a heat balance on the air separation cycle. It is undesirable to work expand more air than is required by the heat balance, because such excess air expansion would reduce the efficiency of the process and may require an oversized turbine.

Principal objects of the present invention are to provide a process and apparatus for purifying and separating compressed air utilizing a side-bleed for unbalancing the reversible heat exchange zone, means for removing the carbon dioxide impurity from the side-bleed, and means for work expanding at least part of the side-bleed, the steps and apparatus being arranged and related so that each step is conducted under ideal or optimum conditions, the overall result being a highly efficient and low cost system for separation of air into products or components.

These and other objects and advantages of this invention will be apparent from the following description and accompanying drawings in which:

FIG. 1 shows a flow diagram of a system for purifying an air stream and preparing a portion of such stream for work expansion.

According to the present invention, an air stream at an inlet pressure below 150 p.s.i. is passed to a reversible heat exchange zone, partially cooled to at least $-80°$ C. for removal of the water impurity by deposition in such zone, and divided into major and minor portions. The minor or side-bleed portion is withdrawn from the zone and further cooled by heat exchange with a first colder fluid to a temperature slightly above the deposition point of carbon dioxide at the inlet pressure. The dissolved carbon dioxide impurity is then removed by adsorption from this further cooled side-bleed stream. Also, the major portion of the air stream is further cooled in the reversible heat exchange zone, and at least most of the carbon dioxide impurity of such portion is removed by deposition in the colder part of such zone. At least part of the further cooled carbon dioxide-free major portion, or cold end air, is passed to a rectification zone for separation into air components. The water and carbon dioxide impurities deposited in the reversible heat exchange zone are removed by passing at least part of the separated air components through such zone to evaporate such impurities therein for discharge from the zone.

In one embodiment of the invention, a minor part of the cold end air is diverted and passed in cocurrent heat exchange with the partially cooled side-bleed air as the first colder fluid.

If an air stream is to be work expanded, this invention provides a method of forming an expander inlet stream having suitable flow and temperature so as to achieve optimum work expansion conditions as well as self-cleaning conditions. This may be accomplished by diverting a regulated part of the partially cooled carbon dioxide-free side-bleed air, slightly throttling the undiverted side-bleeed, and diverting a regulated part of the cold end air to the slightly throttled undiverted side-bleed, thus providing the desired expander inlet stream.

It can be seen from the previous brief descriptions that this invention permits ideal operating conditions in the various steps of the air separation cycle, the overall result being a highly efficient and economical method of obtaining air separation products such as oxygen and nitrogen. Furthermore, this invention eliminates the previously described disadvantages of the direct mixing and chilling method of treating the air side-bleed. In the present invention, there is no direct mixing with cold end air prior to carbon dioxide removal, hence the side-bleed is cooled to the ideal temperature for carbon dioxide removal, hence the side-bleed is cooled to the ideal temperature for carbon dioxide removal without the necessity of using a filter or a larger silica gel trap. Furthermore, it will be noted that no throttling of the side-bleed occurs prior to carbon dioxide removal, hence cleaned side-bleed air may be diverted to the cold end air without having to throttle the latter stream to induce flow in the desired direction.

Referring now to the drawings and particularly to FIG. 1, air is compressed in compressor 10 to a pressure of less than 150 p.s.i.g. and preferably about 75 p.s.i.g., and the heat of compression may be removed by, for example, a water-cooled exchanger (not shown). The compressor discharge air stream passes through conduit 11 and reversing valves 12 to a reversible heat exchange zone 13, which may comprise regenerators or reversing heat exchangers. In zone 13 the air stream is cooled by heat exchange with air separation products such as oxygen or nitrogen, such products entering the cold end of the reversing heat exchange zone 13 through conduit 14 and reversing valves 14a therein, and emerging through conduit 15 at the warm end of zone 13. The manner of cooling the air stream by heat exchange either with a colder fluid in an adjacent passageway, or through an intermediate refrigeration storage means such as regenerative packing, is well-known to those skilled in the art and described in Fränkl U.S. Patent 1,890,646 for regenerators, and Trumpler U.S. Patent 2,460,859 for reversing heat exchangers. Reversing valves 12 and 14a are suitably connected to each other and to the zone 13 in order to achieve this cyclic heat exchange.

The water content of the inlet air stream is removed by deposition in the warmer part of the reversible heat exchange zone 13, and such stream is divided into major and minor portions by withdrawing a minor portion or side-bleed at approximately $-100°$ C. through conduit 16 and valve 17 therein. The side-bleed air may constitute approximately 3% to 15% of the total inlet air stream, and preferably about 10%. One purpose of the side-bleed is to bypass a sufficient portion of the inlet air stream around the colder part of the reversing heat exchange zone 13 so that the flow ratio of outgoing air separation products to inlet air will be sufficiently increased to achieve a self-cleaning temperature pattern in the zone 13. As previously discussed, it may be preferable to withdraw the side-bleed air at the $-80°$ C. to $-100°$ C. level instead of a lower temperature level to minimize the side-bleed flow and positively avoid carbon dioxide deposition in the heat exchange zone 13 above the side-bleed level.

The partially cooled minor air portion or side-bleed is conducted through conduit 16 to passageway 18 where it engages in cocurrent heat exchange (i.e. in the same direction) with a first colder fluid in passageway 19, and is itself further cooled to approximately $-120°$ C. This is an optimum temperature for silica gel adsorption of carbon dioxide from 75 p.s.i. air which still provides a safe margin above the deposition point of carbon dioxide at this pressure. At these conditions, carbon dioxide begins depositing at approximately $-134°$ C., and if the side-bleed air were cooled appreciably below about $-120°$ C., it is probable that some carbon dioxide deposition would occur in the heat exchange zone 13 above the side-bleed level, in passageway 18, and in the interconnecting piping, and this could eventually necessitate a shut-down for thaw. The further cooled side-bleed is passed from passageway 18 through conduit 19a and inlet valves 20 into one or the other of a pair of the silica gel traps 21 for removal of the still dissolved carbon dioxide by silica gel adsorption. These gel traps are provided in duplicate and piped in parallel for alternate operation so that when one gel trap becomes loaded with carbon dioxide, the side-bleed air may be diverted to the other gel trap having previously been purged and reactivated by means not illustrated. As previously discussed, it is preferable to conduct the adsorption step at relatively low temperatures, such as $-120°$ C., because the carbon dioxide adsorptive capacity of silica gel is higher at lower temperatures. The carbon dioxide-free side-bleed air emerges through silica gel trap discharge valves 22 into conduit 23.

Meanwhile, the major portion of the inlet air stream is further cooled in the reversible heat exchange zone 13, and most of its carbon dioxide impurity is removed by disposition in the colder part of such zone. The further cooled major portion is discharged from the cold end of zone 13 at approximately −173° C. into conduit 24, and thence passes to cold end trap 25 for silica gel filtration and adsorption of any residual carbon dioxide not previously removed. The carbon dioxide-free further cooled air, or cold end air, is discharged from silica gel trap 25 into conduit 26.

In this particular cycle, it is desirable to expand an air stream with the production of external work, but the carbon dioxide-free side-bleed air stream is too warm (−120° C.) and may be too large or too small in volume for optimum work expansion conditions. An air stream having suitable flow and temperature for work expansion may be formed by first diverting a regulated part e.g. 60%, of the side-bleed through conduit 27 and regulating valve 28, and still further cooling such diverted part to approximately −170° C. by passage through passageway 29 in heat exchange with a colder fluid flowing through passageway 30. Such colder fluid may be, for example, nitrogen product from the rectification column. This diverted stream still further cooled in conduit 27 is then mixed with the cold end air either downstream or upstream of the cold end silica gel trap 25. The further cooled major portion or cold end air is passed through conduit 26 to the rectification column (not shown) for separation into products such as oxygen and nitrogen in a manner well-known to those skilled in the art. Alternatively, the diverted part in conduit 27 may be passed directly to the rectification column instead of united with cold end air.

In the previously described system, it is to be noted that air flow is obtained in the desired direction, that is, from the side-bleed stream to the cold end stream, because the presure drop in the side-bleed circuit is less than the pressure drop through the colder part of the reversing heat exchange zone 13 and the cold end gel trap 25. Since cold end air is to be diverted from conduit 26 to the carbon dioxide-free side-bleed in conduit 23 to cool the latter stream, it is necessary to slightly throttle the side-bleed by means of valve 31 to a pressure just below the pressure of the cold end air in conduit 26. A regulated part, e.g. 18% of the latter, is diverted through conduit 32 and passed through passageway 19 in cocurrent heat exchange with the side-bleed in conduit 18 to further cool the latter as said first colder fluid. A bypass conduit 33 and valve 34 are provided to insure flexibility of operation.

Cocurrent heat exchange assures that the metal wall temperature in the heat exchanger formed by passageways 18 and 19 will not drop below −134° C. at any point, and hence carbon dioxide will not be deposited therein. Cocurrent flow, although less efficient than countercurrent flow, is preferred when cold end air is used for cooling the side-bleed air, since this arrangement places the warmest portion of the side-bleed air (at −100° C.) adjacent to the coldest portion of the cold end air (at −173° C.). Thus, the arithmetic average of the temperatures at the inlet end of the cocurrent heat exchanging passageways 18 and 19 is about −136° C., and the metal wall temperature can easily be raised well above the carbon dioxide deposition range by increasing the heat transfer surface on the air side-bleed passageway 18, which is the warm side of the heat exchanger. In practice, it is preferable to provide a warm side "$hA$" value (heat transfer coefficient $x$ area) about 25% greater than the $hA$ value for the cold side.

It is possible to employ countercurrent heat exchange, but in this case the coldest portion of the side-bleed air (at −120° C.) is adjacent to the coldest portion of the cold end air at −173° C., and the arithmetic average the cold end air at −173° C., and the arithmetic average is −145° C. Thus, it is more difficult to design and operate a countercurrent heat exchanger to maintain the walls of passageway 18 above the critical −134° C. temperature.

The partially rewarmed diverted cold end air in conduit 32 mixes with the slightly throttled side-bleed from conduit 23 to form a turbine inlet stream in conduit 35. The flow of this stream and the diverted cold end air in conduit 32 are regulated by valve 36 in conduit 35. In this manner, an expander inlet stream is formed so as to achieve optimum work expansion conditions, and the regulated inlet stream in conduit 35 at about −153° C. enters turbine 37 for work expansion therein to about 3 p.s.i. and −183° C. The turbine discharge stream in conduit 38 may either be passed to the rectification column for separation into air components, or united with the portion of these components passing to the reversible heat exchange zone 13 for cooling and partially cleaning the inlet air therein. A further possibility is dividing the work expanded side-bleed air so that a part thereof may be directed to each of the aforementioned points. In any event, this stream contains a substantial quantity of refrigeration, and the cycle efficiency is greatly improved when such refrigeration is recovered.

Although preferred embodiments of the invention have been described in detail, it is contemplated that modifications of the process and the apparatus may be made and that some features may be employed without others, all within the spirit thereof as set forth in the claims. The principles of the invention may also be applied to the purification and separation of other low-boiling gas mixtures containing water and carbon impurities.

What is claimed is:

1. A process for the separation of water and carbon dioxide impurities from a compressed gas mixture prior to low-temperature rectification of the gas into its components including the steps of providing a gas mixture stream at an inlet pressure below 150 p.s.i., passing such stream to a reversible heat exchange zone, partially cooling the stream in such zone to a temperature at least as cold as −80° C. and removing the water impurity by deposition in the heat exchange zone, dividing the partially cooled gas mixture stream into major and minor portions, withdrawing the minor portion from said reversible heat exchange zone and further cooling such portion by heat exchange with a colder fluid to a temperature slightly warmer than the deposition point of carbon dioxide at said inlet pressure by passing the minor portion through one passage of a heat exchanger while said colder fluid is passed through an adjacent passage of said heat exchanger, removing the dissolved carbon dioxide impurity from the further cooled minor portion of said gas mixture stream by adsorption at said temperature, removing at least most of the carbon dioxide impurity from the partially cooled major portion of said gas mixture stream by further cooling and deposition thereof in said reversible heat exchange zone, passing at least part of the further cooled major portion to a rectification zone for separation into gas mixture components, and removing the water and carbon dioxide impurities deposited in said reversible heat exchange zone by passing at least part of the separated gas mixture components through the zone and evaporating such impurities therein for discharge from such zone.

2. A process for the separation of water and carbon dioxide impurities from compressed air prior to low-temperature rectification of the air into its components including the steps of providing an air stream at an inlet pressure below 150 p.s.i., passing such stream to a reversible heat exchange zone, partially cooling the air stream in such zone to a temperature at least as cold as −80° C. and removing the water impurity by deposition in the heat exchange zone, dividing the partially cooled air stream into major and minor portions, withdrawing the minor portion from said reversible heat exchange zone and further cooling such portion by heat exchange with a first colder fluid to a temperature slightly warmer than the deposition point of carbon dioxide at said inlet pressure by passing the minor portion through one passage of a heat exchanger while said colder fluid is passed through an adjacent passage of said heat exchanger, removing the dissolved carbon dioxide impurity from the further cooled minor portion of said air stream by adsorption at said temperature, removing at least most of the carbon dioxide impurity from the partially cooled major portion of said air stream by further cooling and deposition thereof in said reversible heat exchange zone, passing at least part of further cooled major portion to a rectification zone for separation into air components, and removing the water and carbon dioxide impurities deposited in said reversible heat exchange zone by passing at least part of the separated air components through the zone and evaporating such impurities therein for discharge from such zone.

3. A process according to claim 2 for the separation of water and carbon dioxide impurity-containing air prior to low-temperature rectification of the air in which a minor part of said further cooled carbon dioxide-free major portion is diverted to a heat exchanger and further cools said minor portion of said partially cooled air stream therein as said first colder fluid.

4. A process according to claim 2, for the separation of water and carbon dioxide impurity-containing air prior to low-temperature rectification of the air in which a minor part of said further cooled major portion is diverted to a heat exchanger and concurrently further cools said minor portion of said partially cooled air stream therein as said first colder fluid.

5. A process for the separation of water and carbon dioxide impurity-containing air by low-temperature rectification of the air into its components including the steps of providing an air stream at an inlet pressure below 150 p.s.i., passing such stream to a reversible heat exchange zone, partially cooling the air stream in such zone to a temperature at least as cold as −80° C. and removing the water impurity by deposition in the heat exchange zone, dividing the partially cooled air stream into major and minor portions, withdrawing the minor portion from said reversible heat exchange zone and further cooling such portion by heat exchange with a first colder fluid in a heat exchanger to a temperature slightly warmer than the deposition point of carbon dioxide at said inlet pressure, removing the dissolved carbon dioxide impurity from the further cooled minor portion of said air stream by adsorption at said temperature and slightly throttling such carbon dioxide-free minor portion, removing at least most of the carbon dioxide impurity from the partially cooled major portion of said air stream by further cooling and deposition thereof in said reversible heat exchange zone, diverting a minor part of such further cooled major portion as said first colder fluid which further cools said minor portion of said partially cooled air stream, mixing such warmed minor part with the slightly throttled minor portion of said air stream, expanding such mixture with the production of external work, passing another part of the further cooled major portion to a rectification zone for separation into air components, and removing the water and carbon dioxide impurities deposited in said reversible heat exchange zone by passing at least part of the separated air components through the zone and evaporating such impurities therein for discharge from such zone.

6. A process according to claim 5 for the separation of water and carbon dioxide impurity-containing air in which part of said carbon dioxide-free minor portion of said air stream is diverted and passed to said rectification zone.

7. A process according to claim 5 for the separation of water and carbon dioxide impurity-containing air in which part of said carbon dioxide-free minor portion of said air stream is diverted, still further cooled by a second colder fluid, and passed to said rectification zone.

8. A process for the low-temperature rectification of compressed air into its components comprising the steps of providing an air stream at an inlet pressure below 150 p.s.i.; passing such stream to a reversible heat exchange zone; partially cooling the mixture in such zone to a temperature at least as cold as −80° C. and removing the water impurity by deposition in the heat exchange zone; dividing the partially cooled air stream into major and minor portions; withdrawing the minor portion from such zone, the minor portion being of such temperature and quantity that said heat exchange zone is maintained in a self-cleaning condition; further cooling the major portion of said air stream in said heat exchange zone and removing at least most of the carbon dioxide impurity from such portion by deposition in such zone; further cooling the withdrawn partially cooled minor portion in a heat exchanger to a temperature slightly warmer than the deposition point of the carbon dioxide impurity removing the dissolved carbon dioxide impurity from said minor portion by adsorption at said temperature; forming a gas mixture having optimum flow and temperature for work expansion by diverting a regulated part of the minor portion to the further cooled major portion, slightly throttling the remaining undiverted part of said withdrawn minor portion, and diverting a regulated part of said further cooled major portion to the slightly throttled minor portion thereby forming the work expansion inlet stream; expanding such inlet stream to a low pressure with production of external work; rectifying at least part of the further cooled major portion of said air stream in a rectification zone for separation into air components; and removing the water and carbon dioxide impurities deposited in said heat exchange zone by passing at least part of the separated air components through the zone and evaporating such impurities therein for discharge from such zone.

9. Apparatus for the separation of water and carbon dioxide impurity-containing air by low-temperature rectification including a rectifying device; means by which inlet air is supplied at a pressure below 150 p.s.i.; a reversible heat exchange zone for partially cooling the inlet air to a temperature at least as cold as −80° C. so that the water impurity is deposited in such zone; means for dividing the partially cooled inlet air stream into major and minor portions; means for withdrawing the minor portion from said reversible heat exchange zone; means comprising a heat exchanger for further cooling the withdrawn minor portion by indirect heat exchange with a first colder fluid to a temperature slightly warmer than the deposition point of carbon dioxide at said inlet pressure; means comprising an adsorption trap for removing the dissolved carbon dioxide impurity from the further cooled minor portion; means for further cooling the major portion of said air stream in said reversible heat exchange zone so that at least most of the carbon dioxide impurity is deposited in such zone; means for passing at least part of the further cooled major portion to said rectifying device for separation into air components; and means for passing at least part of the separated air components through the reversible heat exchange zone to evaporate and discharge the previously deposited air impurities from such zone.

10. Apparatus according to claim 9 for the separation of water and carbon dioxide impurity-containing air including means by which a part of said further cooled major portion is diverted to a heat exchanger and passed in cocurrent heat exchange therein with said withdrawn minor portion as said first colder fluid.

11. Apparatus according to claim 9 for the separation of water and carbon dioxide impurity-containing air including means for slightly throttling the withdrawn carbon dioxide-free minor portion; means by which a part of said further cooled major portion is diverted to a heat exchanger and passed in heat exchange therein with said withdrawn minor portion as said first colder fluid; means for mixing such warmed diverted part with the slightly throttled minor portion of said air stream to form a work expander inlet stream; and means comprising a work expander for expanding such inlet stream to a low pressure with the production of external work.

12. Apparatus according to claim 9 for the separation of water and carbon dioxide impurity-containing air including means by which a part of the carbon dioxide-free further cooled minor portion is diverted and passed to said rectifying device; means by which the undiverted part of such minor portion is slightly throttled; means by which part of said further cooled major portion is diverted to a heat exchanger and passed in heat exchange therein with said withdrawn minor portion as said first colder fluid; means for mixing such warmed diverted part of the major portion with the slightly throttled undiverted part of said minor portion to form a work expander inlet stream; and means comprising a work expander for expanding such inlet stream to a low pressure with the production of external work.

13. Apparatus for the separation of air by low-temperature rectification including a rectifying device; means by which inlet air is supplied at a pressure below 150 p.s.i.; a reversible heat exchange zone for partially cooling the inlet air stream to a temperature at least as cold as −80° C.; means for dividing the partially cooled inlet air stream into major and minor portions; means for withdrawing the minor portion from said reversible heat exchange zone; a heat exchanger; means for passing the withdrawn minor portion of said air stream to said heat exchanger; means for passing a colder fluid to said heat exchanger so as to further cool such minor portion therein to a temperature slightly warmer than the deposition point of carbon dioxide at said inlet pressure; means comprising an adsorption trap for removing said dissolved carbon dioxide impurity from the further cooled minor portion, means for further cooling the major portion of said inlet air stream in said reversible heat exchange zone; means for forming a gas mixture having suitable flow and temperature for work expansion comprising means for diverting a part of the withdrawn further cooled and cleaned minor portion to the further cooled major portion and means for regulating such diverted part, means for slightly throttling the undiverted part of said withdrawn minor portion, means for diverting a part of said further cooled major portion to the slightly throttled undiverted minor portion and means for regulating such diverted part to complete formation of the work expander inlet stream; and means comprising a work expander for expanding such inlet stream to a low pressure with the production of external work; means for passing at least part of the further cooled major portion of said air stream to said rectifying device for separation into air components; and means for passing at least part of the separated air components through the reversible heat exchange zone to cool such zone.

14. Apparatus for the separation of water and carbon dioxide impurity-containing air by low-temperature rectification including a rectifying device; means by which inlet air is supplied at a pressure below 150 p.s.i.; a reversible heat exchange zone for partially cooling the inlet air to a temperature at least as cold as −80° C. so that the water impurity is deposited in such zone; means for dividing the partially cooled inlet air stream into major and minor portions; means for withdrawing the minor portion from said reversible heat exchange zone; means comprising a heat exchanger for further cooling the withdrawn minor portion by heat exchange with a first colder fluid to a temperature slightly warmer than the deposition point of carbon dioxide at said inlet pressure; means comprising an adsorption trap for removing the dissolved carbon dioxide impurity from the further cooled minor portion; means for diverting a part of the carbon dioxide-free further cooled minor portion; means for cooling the diverted part of the carbon dioxide-free minor portion by heat exchange with a second colder fluid; means for passing the cooled diverted part of the carbon dioxide-free minor portion to said rectifying device; means by which the undiverted part of such minor portion is slightly throttled; means for further cooling the major portion of said air stream in said reversible heat exchange zone so that at least most of the carbon dioxide impurity is deposited in such zone; means by which part of said further cooled major portion is diverted to a heat exchanger and passed in heat exchange therein with said withdrawn minor portion as said first colder fluid; means for mixing such warmed diverted part of the major portion with the slightly throttled undiverted part of said minor portion to form a work expander inlet stream; means comprising a work expander for expanding such inlet stream to a low pressure with the production of external work; means for passing the remaining undiverted part of the further cooled major portion to said rectifying device for separation into air components; and means for passing at least part of the separated air components through the reversible heat exchange zone to evaporate and discharge the previously deposited air impurities from such zone.

References Cited in the file of this patent

UNITED STATES PATENTS

| | | |
|---|---|---|
| 2,270,852 | Schuftan | Jan. 27, 1942 |
| 2,655,796 | Rice | Oct. 20, 1953 |
| 2,824,428 | Yendall | Feb. 25, 1958 |
| 2,825,212 | Linde | Mar. 4, 1958 |
| 2,827,775 | Linde | Mar. 25, 1958 |
| 2,827,776 | Karwat | Mar. 25, 1958 |

FOREIGN PATENTS

| | | |
|---|---|---|
| 725,538 | France | Feb. 15, 1932 |
| 554,706 | Germany | July 22, 1932 |
| 1,229,209 | France | Mar. 21, 1960 |